3,144,422
POLYOLEFINS STABILIZED WITH PENTA-ERYTHRITOL MERCAPTO ESTERS
Otto A. Homberg, Woodlawn, Ohio, assignor to Carlisle Chemical Works, Inc., Reading, Ohio, a corporation of Ohio
No Drawing. Filed Jan. 3, 1962, Ser. No. 164,180
13 Claims. (Cl. 260—23)

This invention relates to esters of thiocarboxylic acids and the stabilization of polymers with such esters.

It is an object of the present invention to prepare novel pentaerythritol esters.

Another object is to prepare novel esters of alkane 1,1,1-triols.

A further object is to stabilize polymeric monoolefins.

An additional object is to develop antioxidants and stabilizers for vinyl resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the preparation of esters having the formula $$\left(HS-\left(\begin{array}{c}R_1\\|\\C\\|\\H\end{array}\right)_n-COOCH_2\right)_3 CR_2$$

where $R_1$ is selected from the group consisting of hydrogen and alkyl, $R_2$ is selected from the group consisting of alkyl and $$HS-\left(\begin{array}{c}R_1\\|\\C\\|\\H\end{array}\right)_n-COOCH_2-$$

and $n$ is an integer from 1 to 4 inclusive. Preferably $R_2$ is $$HS\left(\begin{array}{c}R_1\\|\\C\\|\\H\end{array}\right)_n-COOCH_2-$$

Illustrative of compounds within the present invention are pentaerythritol tetra(mercaptoacetate),
pentaerythritol tetra($\beta$-mercaptopropionate),
pentaerythritol tetra($\alpha$-mercaptopropionate),
pentaerythritol tetra($\gamma$-mercaptobutyrate),
pentaerythritol tetra($\Delta$-mercaptovalerate),
1,1,1-trimethylolethane tri(mercaptoacetate),
1,1,1-trimethylolethane tri($\beta$-mercaptopropionate),
1,1,1-trimethylolethane tri($\alpha$-mercaptopropionate),
1,1,1-trimethylolethane tri($\gamma$-mercaptobutyrate),
1,1,1-trimethylolethane tri($\Delta$-mercaptovalerate),
1,1,1-trimethylolpropane tri(mercaptoacetate),
1,1,1-trimethylolpropane tri($\beta$-mercaptopropionate),
1,1,1-trimethylolpropane tri($\alpha$-mercaptopropionate),
1,1,1-trimethylolpropane tri($\gamma$-mercaptobutyrate),
1,1,1-trimethylolpentane tri(mercaptoacetate),
1,1,1-trimethylolheptadecane tri(mercaptoacetate),
1,1,1-trimethylolheptadecane tri($\beta$-mercaptopropionate).

The compounds of the present invention are prepared by reacting pentaerythritol or the appropriate 1,1,1-trimethylolalkane, e.g. 1,1,1-trimethylolethane, 1,1,1-trimethylolpropane, 1,1,1-trimethylolpentane or 1,1,1-trimethylolheptadecane with the appropriate mercaptoalkanoic acid, e.g. mercaptoacetic acid, $\alpha$-mercaptopropionic acid, $\beta$-mercaptopropionic acid, $\gamma$-mercaptobutyric acid and $\Delta$-mercaptovaleric acid. There should be used at least one mole of mercaptoalkanoic acid for each available polyol group, i.e. at least four moles of mercaptoalkanoic acid per mol of pentaerythritol and at least 3 moles of mercaptoalkanoic acid for each mol of 1,1,1-trimethylolalkane. Preferably a slight excess of the mercaptoalkanoic acid over the required amounts is employed. The reaction is preferably carried out in the presence of an acid catalyst.

Unless otherwise indicated all parts and percentages are by weight.

*Example 1*

A mixture of 68 parts of pentaerythritol 290 parts of 70% mercaptoacetic acid (the balance being water), 1 part p-toluenesulfonic acid and 165 parts of toluene were heated under reflux until 113 parts of water had been removed by azeotropic distillation. The mixture was cooled to room temperature and the oil which separated collected, washed well with water, treated with 10 parts each of activated charcoal and super-Filtrol (diatomaceous earth) and stripped to 160° C. at 1.0 mm. Filtration gave 150 parts of pentaerythritol tetra(mercaptoacetate) as a viscous yellow oil $n_D^{25}$ 1.5499, $d_{25}$ 1.385, percent SH 30.0 (theory 30.6%).

*Example 2*

A mixture of 34 parts of pentaerythritol, 117 parts of $\beta$-mercaptopropionic acid, 1 part of p-toluenesulfonic acid, and 205 parts of toluene were heated under reflux until 18 parts of water were removed by azeotropic distillation. The reaction mixture was cooled to room temperature, washed well with water, and stripped to 150° C. at 1.0 mm. to yield 130 parts of pentaerythritol tetra($\beta$-mercaptopropionate) as an oil $n_D^{25}$ 1.5300, $d_{25}$ 1.281, percent SH 27.1% (theory 27.0%).

*Example 3*

The procedure of Example 1 was repeated replacing the pentaerythritol by 60 parts of 1,1,1-trimethylolethane and utilizing only 218 parts of the 70% mercaptoacetic acid to obtain 1,1,1-trimethylolethane tri(mercaptoacetate) as the product after removal of 92.4 parts of water.

*Example 4*

The procedure of Example 2 was repeated replacing the pentaerythritol by 33 parts of 1,1,1-trimethylolopropane and utilizing only 88 parts of the $\beta$-mercaptopropionic acid to obtain 1,1,1-trimethylolpropane tri($\beta$-mercaptopropionate) as the product after removal of 13.5 parts of water.

The compounds of the present invention are useful as antioxidants and stabilizers for halogen containing resins, preferably vinyl chloride resins.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g. vinyl chloride, are vinyl esters of carboxylic acids, e.g. vinyl acetate, vinyl propionate, vinyl butyrate and vinyl benzoate, esters of unsaturated acids, e.g., alkyl and alkenyl acrylates such as methyl acrylate, ethyl acrylate, propyl acrylate, butyl acrylate and allyl acrylate as well as the corresponding methacrylates, e.g. methyl methacrylate and butyl methacrylate, vinyl aromatic compounds, e.g. styrene, p-ethyl styrene, divinyl benzene, vinyl naphthalane, α-methyl styrene, p-methyl styrene, dienes such as butadiene and isoprene, unsaturated amides such as acrylamide, methacrylamide and acrylanilide and the esters of α,β-unsaturated carboxylic acids, e.g. The methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50% of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a preformed resin, e.g. chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g. polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g. 10 to 100 parts for each 100 parts of the vinyl chloride containing resin.

The mercapto containing stablizers of the present invention are used in an amount of 0.05 to 20 parts, preferably 0.1 to 10 parts per 100 parts of halogen containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethylhexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate, cadmium naphthenate, cadmium benzoate, cadmium p-tert, butylbenzoate, barium octyl salicylate, cadmium epoxy stearate, strontium epoxy stearate, cadmium salt of epoxidized acids of soybean oil, and lead epoxy stearate.

In plastisol formulations there is preferably also included from 0.1 to 10 parts per 100 parts of resin of an epoxy vegetable oil such as epoxidized soybean oil or epoxidized tall oil.

Also there can be incorporated a phosphite, e.g. an alkyl, aryl or aralkyl phosphite in an amount of 0.1 to 10 parts per 100 parts of resin. Typical of such phosphites are triphenyl phosphite, tris decyl phosphite, decyl diphenyl phosphite, di(p-tert. butylphenyl) phenyl phosphite, diphenyl o-cresyl phosphite, trioctyl phosphite, tricresyl phosphite and tribenzyl phosphite.

*Example 5*

100 parts of polyvinyl chloride (Geon 101), 40 parts of dioctyl sebacate and 5 parts of pentaerythritol tetra-(mercaptoacetate) were thoroughly mixed and homogenized by working on a roll mill heated at 150° C., for 3 minutes to produce a sheet.

*Example 6*

100 parts of polyvinyl chloride (Geon 121), 50 parts of dioctyl phthalate, 3 parts of epoxidized soybean oil and 4 parts of pentaerythritol tetra(β-mercaptopropionate) were formulated into films.

The mercapto compounds of the present invention are particularly valuable as stabilizers for solid polymers of monoolefins having 2 to 4 carbon atoms. In this connection they have been found to be synergistic with other sulfur containing stabilizers of the type set forth hereinafter.

While the stabilizers of the present invention can be used with polyethylene, polybutylene and polyisobutylene they are preferably employed with homopolymers and copolymers of propylene, e.g. 50–50 molar copolymer of ethylene and propylene.

The solid monoolefin polymers can be prepared by any of the conventional procedures.

The present invention is suitable for the stabilization of the monoolefin polymers regardless of the method employed to prepare the polymer. Thus, there can be stabilized polyethylene, polypropylene, polybutylene and copolymers of ethylene with polypropylene prepared with Ziegler type polymerization catalysts, e.g. trialkyl aluminum (tributyl aluminum) with titanium tetrachloride and dibutyl beryllium with titanium tetrachloride. The polymers can be prepared using any of the Ziegler type of catalyst as set forth in Salyer Patent 2,985,617 for example. However, the stabilizers of the present invention can be employed with polymers of monoolefins prepared by other processes, e.g. polyethylene prepared under high pressure as set forth in Fawcett Patent 2,153,553, for example, or polyethylene, polypropylene or copolymers of ethylene and propylene prepared using Phillips Petroleum or Standard Oil of Indiana type catalysts.

The mercapto compounds of the present invention can be used as stabilizers in an amount of 0.01–10% by weight of the monoolefin polymer. Preferably 0.1–5% of the stabilizer is employed. When the mercapto compounds are employed together with other stabilizers, usually 0.01–10% and preferably 0.1–5% of total stabilizer based on the polymer is employed.

As compounds which can be employed as synergistic stabilizers particularly good results are obtained when there is employed in addition to the pentaerythritol tetra-(mercaptoalkanoate) or 1,1,1-trimethylolalkane tri(mercaptoalkanoate) a neutral sulfur compound having a thio linkage beta to a carbon atom having both a hydrogen atom and a carboxyl group attached thereto. Such compounds are used in an amount of 0.01–10°, preferably 0.1–5%. The preferred thio compound is dilauryl thiodipropionate, other thio compounds include distearyl 3,3' - thiodipropionate, dicyclohexyl - 3,3' - thiodipropionate, dicetyl-3,3'-thiodipropionate, dioctyl-3,3'-thiodipropionate, dibenzyl-3,3'-thiodipropionate, lauryl myristyl - 3,3' - thiodipropionate, diphenyl - 3,3' - thiodipropionate, di-p-methoxyphenyl-3,3'-thiodipropionate, didecyl - 3,3' - thiodipropionate, dibenzyl - 3,3' - thiodipropionate, diethyl-3,3'-thiodipropionate, lauryl ester of 3-methyl-mercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercaptopropionic acid, myristyl ester of 3-hydroxyethyl-mercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl - 4,7 - dithiasebacate, dilauryl - 4,7,8,11 - tetrathiotetradecandioate, dimyristyl - 4,11 - dithiatetradecandioate, lauryl-3-benzothiazylmercaptopropionate. Preferably the esterifying alcohol is an alkanol having 10 to 18 carbon atoms. Other esters of beta thiocarboxylic acids set forth in Gribbins Patent 2,519,744 can also be used.

Other beta thiocarboxylic acids include stearyl (1,2-dicarboethoxyethylthio) acetate, stearyl (1,2-dicarbolauryloxyethylthio) acetate or the like. Compounds of this type can be made by addition of alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similarly useful beta thiocarboxyl synergistic compounds can be prepared by addition of the RSH compounds as defined above across the double bond of dialkyl itaconates, citraconates, fumarates or trialkyl aconitates, e.g. the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the additional product of the lauryl ester of mercaptopropionic acid with triethyl aconitate.

The thermal stability of the polypropylene and other monoolefin polymer is adversely affected by impurities including residual catalyst. When thermal stability is important in addition to oxidative stability it has been found valuable to include polyvalent metal salts of fatty acids in an amount of 0.01–10%, preferably 0.1–5%, in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

Particularly effective synergistic stabilizing compositions have been obtained by utilizing a mixture of (1) the pentaerylthritol or trimethylolalkane mercapto alkanoate, (2) the neutral sulfur compound and (3) the alkaline earth metal salt of a fatty acid.

There can also be added phenolic antioxidants in an amount of 0.01–10%, preferably 0.1–5%. Examples of such phenols include 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butylphenol), 2,6-butyl-4-decyloxyphenol, 2-t-butyl-4-dodecyloxyphenol, 2-t-butyl-4-dodecyloxyphenol, 2-t-butyl-4-octadecyloxyphenol, 4,4'-methylene-bis(2,6-di-t-butyl phenol), p-aminophenol, N-lauryloxy-p-aminophenol, 4,4'-thiobis(3-methyl - 6 - t-butylphenol), bis[o-(1,1,3,3-tetramethylbutyl)phenol] sulfide, 4-acetyl - β - resorcylic acid, A stage p-t-butylphenolformaldehyde resin, 4-dodecyloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid, and t-butylphenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resins (epichlorhydrin-diphenylolpropane resins), phenoxy-propylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tollate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

The stabilization results at 133° C. are shown in the following examples. The polypropylene employed had a metal index of 0.4 and took 24 hours to degrade under the conditions of the stability test. The percent of stabilizer is based on the weight of the polymer. The polyethylene employed was a low density, high pressure polyethylene molecular weight about 20,000 (Alathon 14). The polyethylene was used in Example 9 and the polypropylene was used in all the other examples.

*Example 7*

The stabilizer was a mixture of 0.166% dilaurylthiodipropionate and 0.166% calcium stearate. It took 72 hours for the polypropylene to degrade. This was a comparison example so that the effect on stability of polypropylene by the novel mercaptans of the present invention could be noted when employing other additives. 0.5% pentaerythritol tetra(mercaptoacetate) alone when added to the polypropylene gave a product which degraded in 24 hours.

*Example 8*

|  | Percent |
|---|---|
| Pentaerythritol tetra(mercaptoacetate) | 0.166 |
| Dilaurylthiodipropionate | 0.166 |
| Calcium stearate | 0.166 |

The polypropylene was stable for 216 hours. This clearly shows the synergistic effect of incorporating the pentaerythritol tetra(mercaptoacetate) with the other stabilizers.

*Example 9*

The procedure of Example 8 was repeated but the polypropylene was replaced by polyethylene to give a stabilized polyethylene.

*Example 10*

|  | Percent |
|---|---|
| Dilaurylthiodipropionate | 0.25 |
| Pentaerythritol tetra(mercaptoacetate) | 0.25 |

There was obtained a polypropylene of improved stability.

*Example 11*

|  | Percent |
|---|---|
| Pentaerythritol tetra(β-mercaptopropionate) | 0.166 |
| Dilaurylthiodipropionate | 0.166 |
| Calcium stearate | 0.166 |

The polypropylene was stable for 96 hours.

*Example 12*

|  | Percent |
|---|---|
| 1,1,1-trimethylolethane tri(mercaptoacetate) | 0.166 |
| Dilaurylthiodipropionate | 0.166 |
| Calcium stearate | 0.166 |

There was obtained a polypropylene of improved stability.

*Example 13*

|  | Percent |
|---|---|
| 1,1,1-trimethylolpropane tri(mercaptoacetate) | 0.166 |
| Dilaurylthiodipropionate | 0.166 |
| Calcium stearate | 0.166 |

There was obtained a polypropylene of improved stability.

*Example 14*

| | Percent |
|---|---|
| Pentaerythritol tetra(mercaptoacetate) | 0.166 |
| Dilaurylthiodipropionate | 0.166 |
| 2,6-di-t-butyl-p-cresol | 0.166 |

There was obtained a polypropylene of improved stability.

*Example 15*

| | Percent |
|---|---|
| Pentaerythritol tetra(mercaptoacetate) | 0.125 |
| Dilaurylthiodipropionate | 0.125 |
| Epoxidized soybean oil | 0.125 |
| Calcium stearate | 0.125 |

There was obtained a polypropylene of improved stability.

The stabilizer compositions of the present invention can be packaged and sold as such and can be blended into the polymer of the monolefin by the processor or user of the polymer. Alternatively, the polymer manufacturer can blend the stabilizer into the polymer and sell the stabilized polymer to the processor or ultimate user.

What is claimed is:

1. A polymer of a monolefin having 2 to 4 carbon atoms having admixed therewith a stabilizing amount of a mercapto compound having the formula

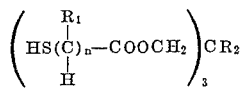

when $R_1$ is selected from the group consisting of hydrogen and alkyl, $R_2$ is selected from the group consisting of alkyl and

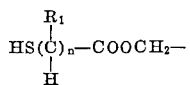

and $n$ is an integer from 1 to 4 inclusive.

2. A polymer composition according to claim 1 including another sulfur compound which is neutral and has a thio linkage beta to a carbon atom having both a hydrogen atom and a carboxyl group attached thereto.

3. A polymer composition according to claim 2 wherein the neutral sulfur compound is dilaurylthiodipropionate.

4. A polymer composition according to claim 2 wherein the mercapto compound is pentaerythritol tetra(mercaptoalkanoate) said mercaptoalkanoate group having 2 to 3 carbon atoms.

5. A polymer composition according to claim 4 wherein the neutral sulfur compound is dilauryl thiodipropionate.

6. Polypropylene having admixed therewith a stabilizing amount of a mercapto compound having the formula

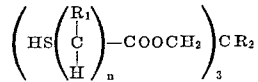

where $R_1$ is selected from the group consisting of hydrogen and alkyl, $R_2$ is selected from the group consisting of alkyl and

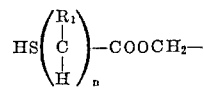

and $n$ is an integer from 1 to 4 inclusive.

7. A polymer composition according to claim 6 including another sulfur compound which is neutral and has a thio linkage beta to a carbon atom having both a hydrogen atom and a carboxyl group attached thereto.

8. A polymer composition according to claim 7 wherein the neutral sulfur compound is a dialkylthiodipropionate, the alkyl groups having 10 to 18 carbon atoms.

9. A polymer composition according to claim 8 wherein the mercapto compound is pentaerythritol tetra(mercaptoalkanoate), said mercaptoalkanoate group having 2 to 3 carbon atoms.

10. A polymer composition according to claim 9 wherein the neutral sulfur compound is dilaurylthiodipropionate.

11. A polymer composition according to claim 10 wherein the mercapto compound is pentaerythritol tetra(mercaptoacetate).

12. A polymer composition according to claim 11 including calcium stearate.

13. A polymer composition according to claim 1 wherein there is employed 0.01 to 10% of the mercapto compound based on the weight of the monoolefin polymer.

References Cited in the file of this patent
UNITED STATES PATENTS

| 2,381,247 | Barth et al. | Aug. 7, 1945 |
| 2,461,920 | Pratt | Feb. 15, 1949 |
| 2,462,331 | Myers | Feb. 22, 1949 |
| 2,522,476 | Wasson | Sept. 12, 1950 |
| 2,579,219 | Valk | Dec. 18, 1951 |
| 3,069,447 | Mack | Dec. 18, 1962 |